United States Patent [19]
Hull, Jr. et al.

[11] 3,889,882
[45] June 17, 1975

[54] RETRACTABLE SOUND SUPPRESSOR FOR A GAS TURBINE ENGINE

[75] Inventors: Thomas Neil Hull, Jr.; James Leroy Nye, both of Marblehead; William Steyer, Ipswich, all of Mass.

[73] Assignee: General Electric Company, Lynn, Mass.

[22] Filed: Mar. 25, 1974

[21] Appl. No.: 454,750

[52] U.S. Cl. ..... 239/127.3; 239/265.13; 239/265.39
[51] Int. Cl. ............................................. B64d 33/04
[58] Field of Search..... 239/265.13, 265.39, 265.41, 239/127.3

[56] References Cited
UNITED STATES PATENTS

| | | | |
|---|---|---|---|
| 2,938,335 | 5/1960 | Cook, Jr. | 239/265.13 |
| 3,032,981 | 5/1962 | Lawler | 239/265.13 |
| 3,372,874 | 3/1968 | Colville et al. | 239/127.3 |
| 3,524,588 | 8/1970 | Duval | 239/265.13 |
| 3,587,973 | 6/1971 | Wolf | 239/265.13 |

Primary Examiner—Robert S. Ward, Jr.
Assistant Examiner—John J. Love
Attorney, Agent, or Firm—James W. Johnson, Jr.; Derek P. Lawrence

[57] ABSTRACT

A retractable sound suppressor is provided for the exhaust duct of a gas turbine engine wherein a plurality of retractable sound suppressor chutes may be operated by a single actuator in synchronization with a plurality of variable nozzle flaps to maintain the effective area of the engine exhaust nozzle substantially unchanged during both the operative and inoperative modes of operation for the sound suppressor.

6 Claims, 5 Drawing Figures

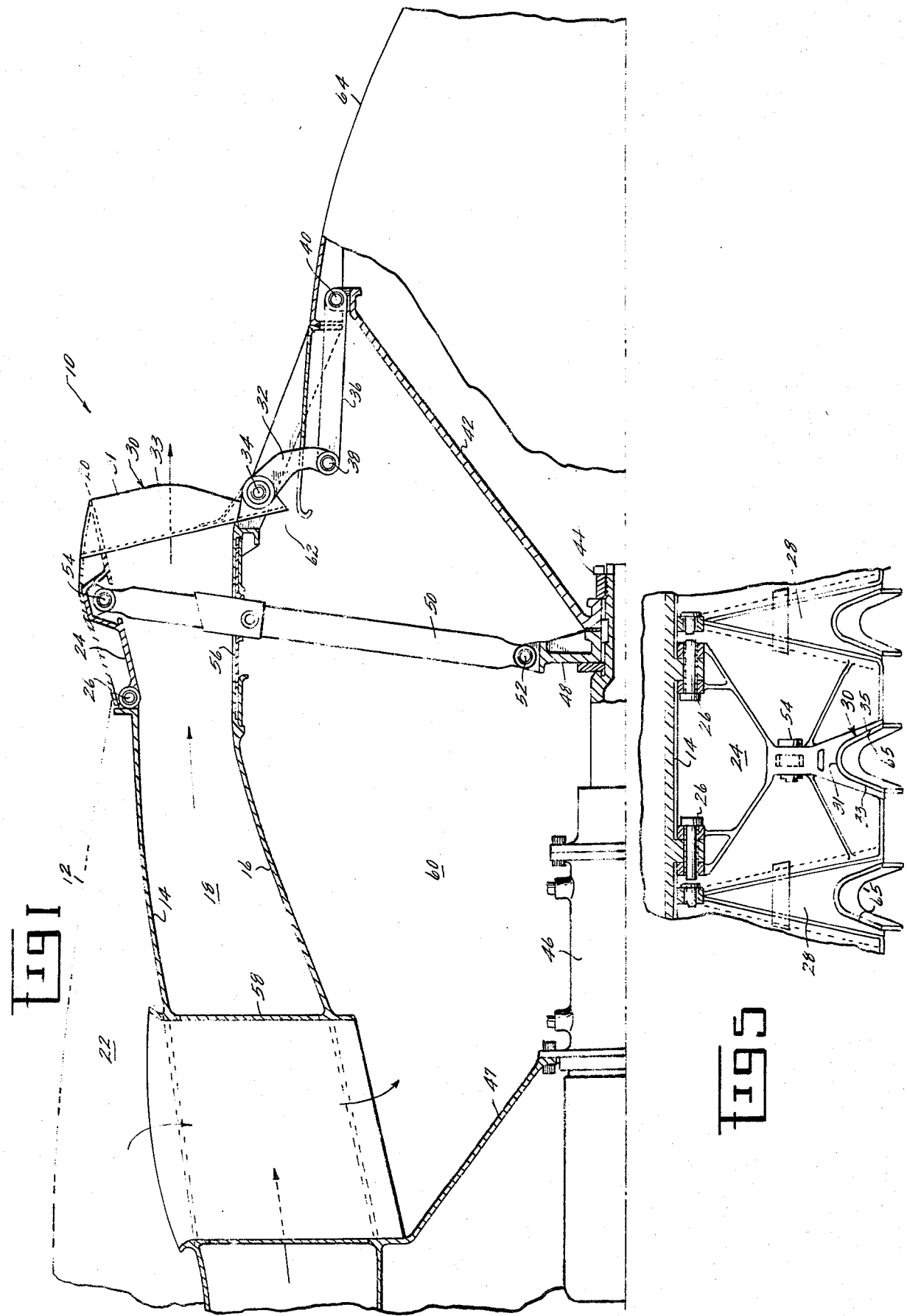

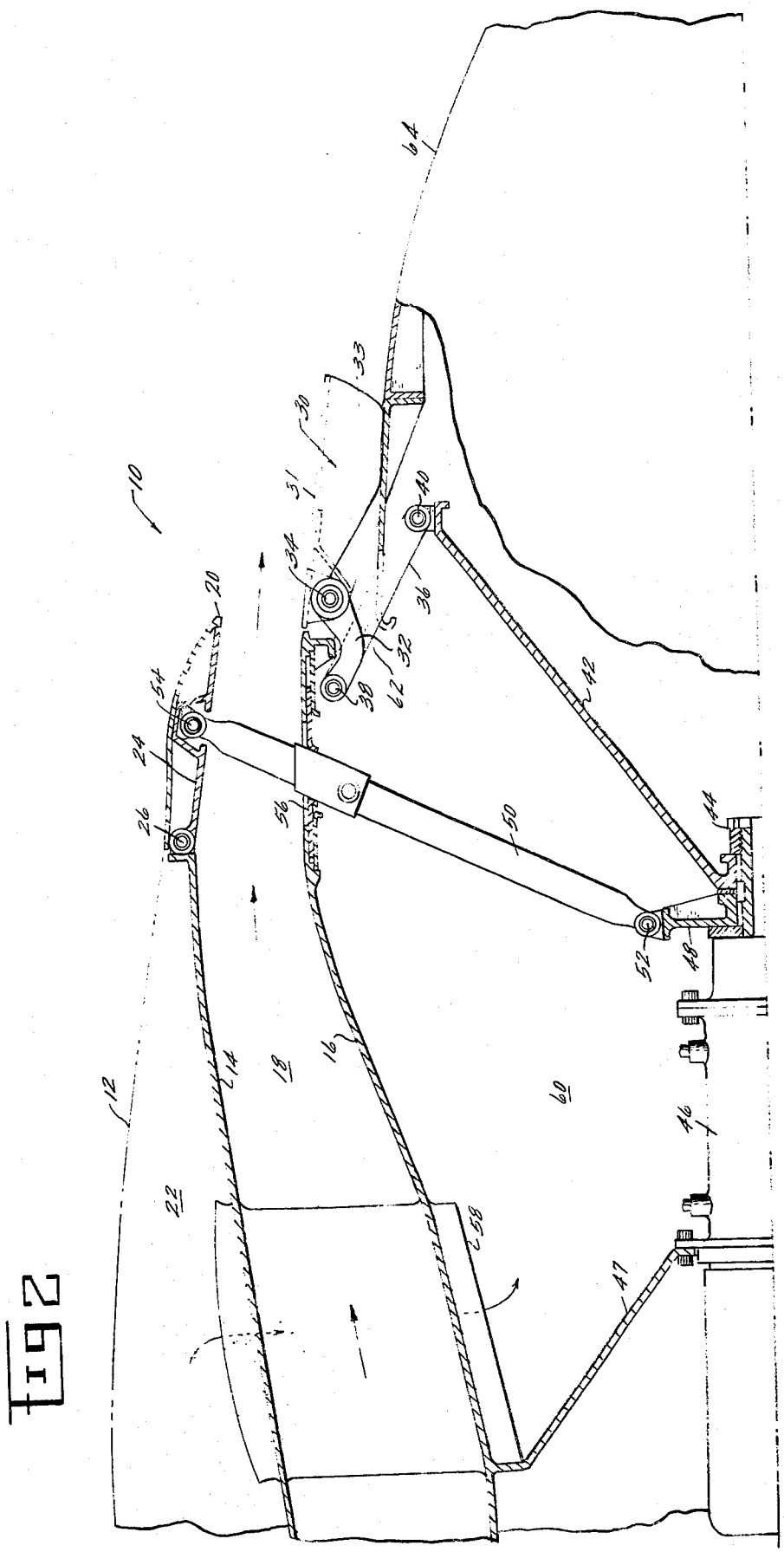

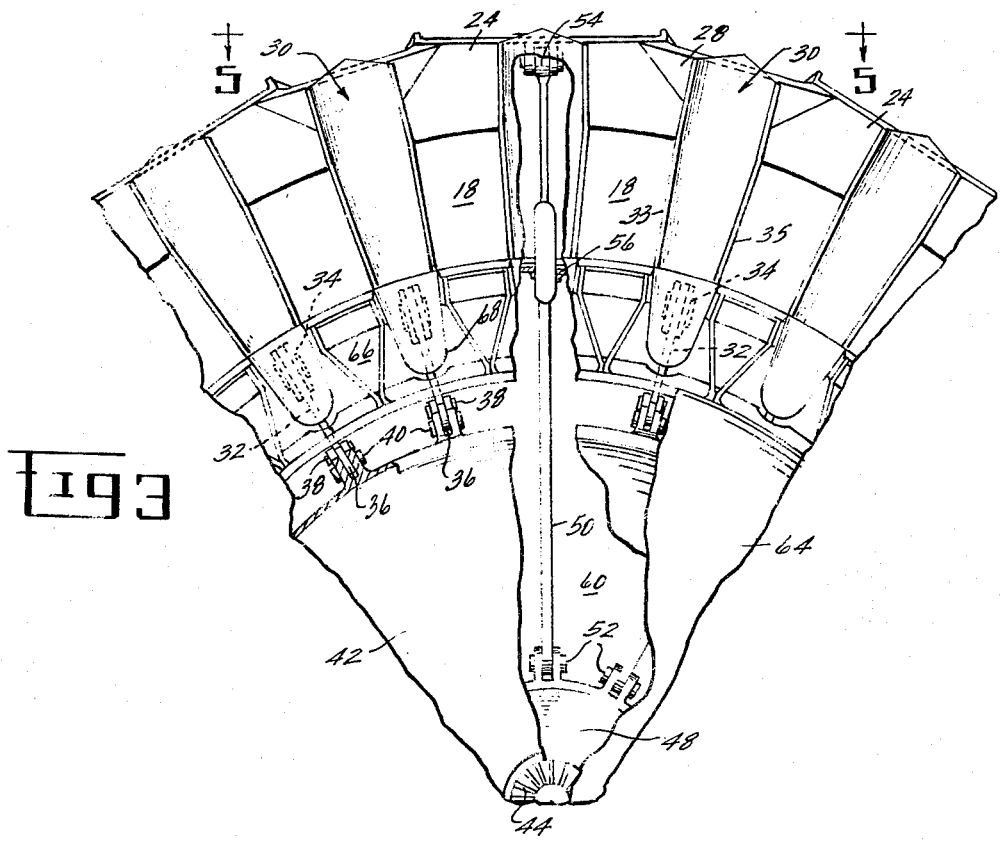
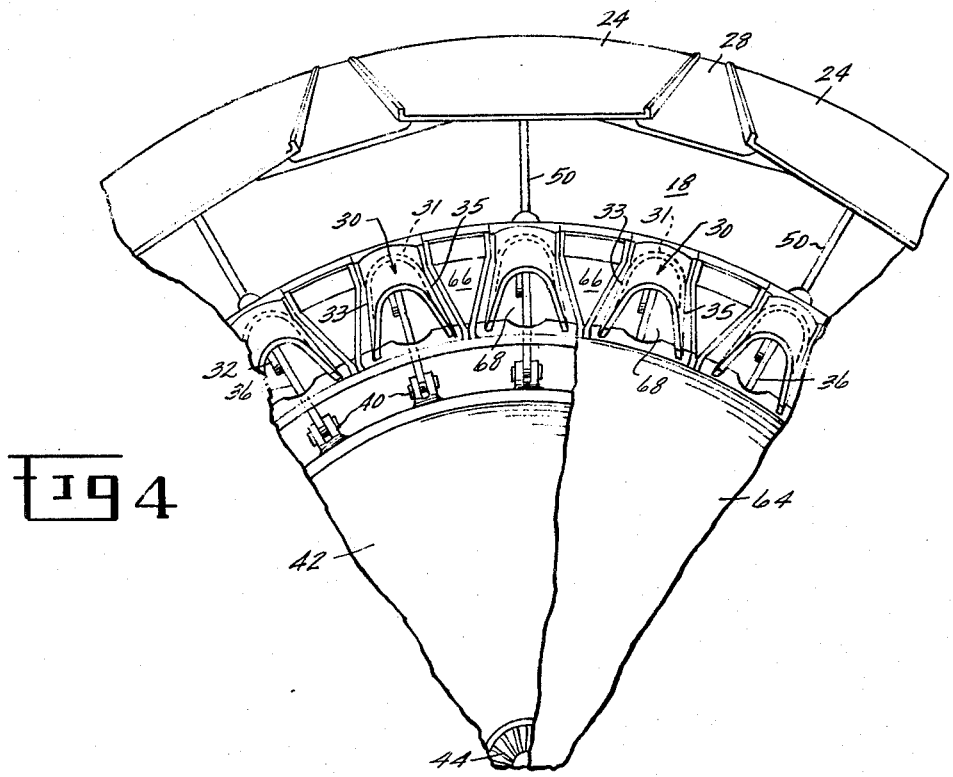

RETRACTABLE SOUND SUPPRESSOR FOR A GAS TURBINE ENGINE

BACKGROUND OF THE INVENTION

In general, this invention relates to a retractable sound suppressor for a gas turbine engine and, more particularly, to a retractable sound suppressor for a gas turbine engine wherein a plurality of variable nozzle flaps may be operated simultaneously with a plurality of retractable divider chutes in a simplified manner by a single actuator.

A gas turbine or jet engine produces a reaction thrust by ejecting a high velocity stream of gas from an exhaust nozzle or tailpipe. Airplanes equipped with jet engines produce a high level of sound energy or noise in a wide range of frequencies. This noise emanates mainly from the inlet and exhaust of the jet engine with additional noise generated by the exhaust stream impinging upon the atmosphere. The noise emitted from the inlet and exhaust is composed of sound energy from the rotating machinery and combustor as well as internal air turbulence. A portion of this noise reaches the ground from airplanes as during takeoff, approach to landing and landing at energy levels which are not acceptable to the public. The problem of aircraft engine noise and its disturbing effect upon people residing in the vicinity of airports has become so acute as of late that the Federal Aviation Agency has established noise level standards which will have to be met by aircraft and gas turbine manufacturers before an aircraft powered by gas turbine engines can be certified.

A variety of noise suppression devices have been suggested for use in the exhaust stream of a gas turbine engine, some of which involve the use of retractable divider chutes as disclosed in U.S. Pat. No. 2,938,335. Spaced apart divider chutes may be rotatably actuated for inclusion into the exhaust stream of a gas turbine engine to provide noise suppression in a well known manner. However, the restriction produced in the exhaust stream by the dividers must be compensated by adjusting the exit nozzle area. One such scheme as suggested by the aforementioned patent involves the use of a translatable convergent-divergent center plug which operates to adjust the effective nozzle area when the divider chutes are extended into the exhaust duct for noise suppression. However, the use of a translatable convergent-divergent nozzle plug may not be warranted in all engine applications, particularly for gas turbine engines which operate only in the subsonic range. Thus other means must be found for compensating the effective area of the exhaust nozzle when the divider chutes are actuated so as to extend into the exhaust stream.

In addition, it is well known in the art to direct cooling airflow between the engine exhaust duct and an outer cowling so as to cool the exterior cowling; however, the inclusion of a retractable sound suppressor may operate to make conventional means of ejecting the cooling airflow from the engine undesirable, particularly from the point of view of optimizing sound suppression.

Therefore, it is a primary object of this invention to provide a simplified retractable sound suppressor for a gas turbine engine wherein the effective area of the nozzle remains substantially unchanged by actuation of the sound suppressing chutes.

It is also an object of this invention to provide a simplified retractable sound suppressor for a gas turbine engine wherein a plurality of sound suppressing chutes operate in synchronization with a plurality of variable nozzle flaps to maintain the effective area of the engine exhaust nozzle substantially unchanged during both the operative and inoperative modes of operation for the sound suppressor.

It is a further object of this invention to provide a simplified retractable sound suppressor for a gas turbine engine wherein the cooling airflow conventionally provided to cool the exterior cowling may be directed to also cool the sound suppressor retracting mechanism, after which the cooling airflow may be ejected in a manner which optimizes sound suppression.

SUMMARY OF THE INVENTION

These and other objects and advantages will become clearly understood from the following detailed description and drawings, all of which are intended to be representative of, rather than in any way limiting on, the scope of invention. A retractable sound suppressor is provided for the exhaust duct of a gas turbine engine and includes a plurality of circumferentially spaced variable nozzle flaps disposed for rotation about the aft end of the exhaust duct to provide a variable area nozzle. A plurality of circumferentially spaced apart divider chutes are disposed for rotation about the aft end of the exhaust duct. Each chute includes an inwardly extending lever arm by which the chute may be rotated between an inoperative position clear of the exhaust duct and an operative position wherein the chute radiates transversely of the duct. A single actuator means is centrally disposed within the gas turbine engine and first connecting means interconnect the actuator means with the lever arms. A second connecting means interconnects the actuator means with the variable nozzle flaps so that the variable nozzle flaps may be rotated outwardly in synchronization with operation of the divider chutes. In this manner the outer radial tips of the divider chutes engage respective nozzle flaps thus maintaining substantially the same effective nozzle area for the suppressed and non-suppressed mode of operation.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a partial cross-sectional view of a portion of the aft end of a gas turbine engine including the retractable sound suppressor of this invention.

FIG. 2 is a partial cross-sectional view of a different mode of operation for the retractable sound suppressor of FIG. 1.

FIG. 3 is a fragmented cross-sectional view from the aft end of the engine of FIG. 1.

FIG. 4 is a fragmented cross-sectional view from the aft end of the engine of FIG. 2.

FIG. 5 is a partial top view as seen across the lines 5—5 of FIG. 3.

DESCRIPTION OF THE PREFERRED EMBODIMENT

Referring to FIGS. 1 and 2, there is shown the aft portion of a gas turbine engine 10 housed within a surrounding streamlined exterior cowling 12 of which only the aftmost end is shown. Inside of the cowling 12 and spaced apart therefrom are provided two spaced apart annular walls 14, 16 which cooperatively define an annular exhaust duct 18. The duct 18 conducts the gases of combustion rearwardly to a jet orifice or nozzle 20 from whence the gases are discharged to provide propulsive thrust. Between the annular wall 14 and the exterior cowl 12 there is defined an annular plenum 22, which receives a cooling airflow from the upstream end of the engine 10 in order to cool the exterior cowling 12. A plurality of circumferentially spaced apart variable nozzle flaps 24 are disposed about the aft end of the annular wall 14 and rotatably connected thereto at pivots 26. A plurality of seal strips 28 are interleaved between the variable flaps 24 in a known manner in order to seal the areas between the variable flaps 24 as best shown in FIG. 5.

A plurality of circumferentially spaced apart retractable sound suppressing divider chutes 30 are provided at the downstream end of the inner wall 16 wherein each chute includes an integral lever arm 32 extending inwardly therefrom. Each of the divider chutes 30 in conjunction with its respective lever arm 32 is pivotally connected at 34 to the aft end of the inner annular wall 16. The divider chutes 30 may be of any suitable cross-sectional shape with the preferred configuration having a generally circular cross-sectional leading edge 31 tangentially intersected by diverging sidewalls 33 and 35, as best shown in FIGS. 3 and 4. Other cross-sectional configurations such as a V-shape would also be suitable. Each of the lever arms 32 is pivotally connected at 38 to a respective link 36, the opposing end of which is pivotally connected at 40 to a unison cone or spider 42.

The unison cone 42 is disposed for axial translation relative to the engine center axis by an actuator rod 44 which is fixedly connected to the cone 42. The actuator rod 44 extends from a linear actuator 46 which is centrally disposed in spaced relation from the annular wall 16 by means of an inter-connecting conical wall member 47. The linear actuator 46 may be of any well known hydraulic type wherein hydraulic fluid is supplied under pressure to the actuator through a plurality of conduits (not shown) from a control source of hydraulic fluid (also not shown). Alternatively the linear actuator could be of the screw jack type driven by a rotating motion from a hydraulic, pneumatic or electric motor (not shown). The control for either a hydraulic or screw jack actuator would be similar to that used to control the variable area of a conventional jet exhaust nozzle and thus would be well known to a person of ordinary skill in the art. In fixed connection to the actuator rod 44, there is also provided a unison collar or ring 48 which pivotally connects at 52 to a plurality of circumferentially spaced apart links 50 extending generally radially outward through respective slidable sealing slots 56 in the annular wall 16. The links 50 extend transverse to the annular duct 18 and pivotally engage at 54 respective nozzle flaps 24.

The annular wall 14 and exterior cowl 12 are supported relative to the annular wall 16 by a plurality of circumferentially spaced apart hollow struts 58, each of which provides flow communication from the annular bay 22 to an annular plenum 60 as generally defined between the annular wall 16, the unison cone 42, the actuator 46, and the conical wall member 47. In downstream serial flow arrangement with the annular wall 16 there is provided a tailcone 64, the leading edge of which is spaced radially inward of the wall 16 so as to define an annular ejection slot 62 which functions in a manner as to be made obvious from the following description.

During engine operation the required sound suppression may be accomplished according to the present invention by the divider chutes 30 which are rotatable between an inoperative position clear of the jet nozzle 20 as shown in FIG. 2, and an operative position wherein they radiate transversely of the duct 18 and nozzle 20 in circumferentially spaced apart relation. When noise suppression is desired as during takeoff, landing, or approach to landing, the actuator 46 may be operated to extend the actuator rod 44 to its aftmost position wherein the unison collar 48 and union cone 42 are translated to their aftmost positions. In this manner, the lever arms 32 are simultaneously rotated by the links 36 about their respective points of pivot at 34 so as to rotate the divider chutes 30 into the duct 18. The chutes then radiate at spaced intervals about the nozzle 20 and divide the exhaust stream into smaller jets so as to reduce the effective area of the discharge nozzle. As will be readily appreciated, rearward translation of the unison collar 48 operates to rotate the links 50 about their respective points of pivot at 54 so as to simultaneously rotate the variable nozzle flaps 24 in a counter-clockwise direction about their respective points of pivot at 26. In this manner the variable nozzle flaps 24 are rotated outwardly in synchronization with the rotation of the divider chutes 30 such that the outer radial tips of the divider chutes 30 engage respective nozzle flaps 24 and seal strips 28. Rotation of the variable flaps 24 in the described manner operates to enlarge the area of the nozzle 20 which is simultaneously reduced by the intrusion of the divider chutes 30 so that the total effective discharge area of the nozzle is not materially changed while the aircraft is in flight near the ground. Thus the total effective nozzle area remains substantially the same for all modes of flight operation.

Referring now particularly to FIG. 5, it may be seen that the trailing edge of the nozzle flaps 24 and seal strips 28 are indented respectively at 65, 65' wherein the indentations generally conform to the cross-sectional shape of the divider chutes 30 at their outer radial tips. The divider chutes 30 are arranged when rotated outwardly to align with the indentations 65, 65'. Ram air enters the divider chutes 30 through the indentations 65, 65' flowing radially inward and then outward of the chutes so as to reduce the drag of the chutes and increase performance efficiency. In this manner the ambient airflow is mixed with the exhaust gas stream so as to cool the gas stream and reduce the velocity of the gas stream exiting from the nozzle 20 and thus reduce overall jet noise.

During that mode of operation as normally utilized during cruising flight when the sound energy of the exhaust stream is attenuated before reaching ground level, the divider chutes are rotated into their retracted positions out of the exhaust stream by actuating the actuator 46 to retract the actuator rod 44. In this manner, the unison ring 48 and unison cone 42 are translated to their extreme upstream positions as shown in FIG. 2 wherein the divider chutes 30 are rotated about their respective points of pivot at 34 in a clockwise direction so as to engage the tail cone 64. In like manner, the variable flaps 24 are rotated inwardly in a clockwise direction so as to maintain the equivalent nozzle exit area between the two stages of operation.

As previously discussed, ram air enters the annular plenum 22 and cools the exterior cowling 12 whereupon the ram air is then directed radially inward through the hollow struts 58 and diffused within the annular plenum 60. The cooling airflow is thereafter ejected from the plenum 60 through the annular ejection slot 62 as a result of the locally depressed static pressure caused by the aspirating effect of the high velocity exhaust stream exiting from the nozzle 20. When the divider chutes are retracted as shown in FIG. 2, the cooling airflow is ejected from the spaces between the divider chutes 30, as best shown at 66, and from the spaces inside the divider chutes 30, as best shown at 68 in FIG. 4. The static pressure at the downstream ends of the divider chutes 30 in their retracted positions is further reduced by the flow curvature of the tail cone 64 immediately aft of the chutes. When the chutes are deployed as shown in FIGS. 1 and 3, the cooling airflow is ejected from the annular ejection slot 62 as facilitated by the aspirating effect of the high velocity exhaust stream passing between the divider chutes. By diverting the cooling airflow radially inward through the struts 58, there is also provided a means for cooling the actuator 46 together with its associated linkages which operate the noise suppressor of this invention. In addition, by ejecting the cooling airflow from the inner annular wall member 16, there is also provided a reduction in overall drag along the surface of the tail cone 64 due to the scrubbing effect of the low velocity cooling airflow as it mixes with the high velocity exhaust stream gases.

Accordingly, while the preferred embodiment in the preferred application of the present invention has been depicted and described, it will be appreciated by those skilled in the art that many modifications, substitutions and changes may be made thereto without departing from the invention's fundamental theme. Therefore, having described the preferred embodiment of the invention, what is desired to be secured by Letters Patent is as follows.

What is claimed is:

1. A retractable sound suppressor for the exhaust duct of a gas turbine engine comprising:
 a plurality of circumferentially spaced variable nozzle flaps disposed for rotation about the aft end of the exhaust duct to provide a variable area nozzle;
 a plurality of circumferentially spaced apart divider chutes disposed for rotation about the aft end of the exhaust duct, each chute of which may be rotated between an inoperative position clear of the exhaust duct and an operative position wherein the chute radiates transversely of the duct;
 single actuator means centrally disposed in the gas turbine engine for synchronously rotating the variable nozzle flaps and divider chutes such that the outer radial tips of the divider chutes engage respective nozzle flaps when the divider chutes are in the operative position to thereby substantially maintain the same effective nozzle area for the suppressed and non-suppressed modes of operation.

2. The retractable sound suppressor of claim 1 wherein each divider chute includes an inwardly extending lever arm by which the chute may be rotated and further comprising first connecting means interconnecting the actuator means with the lever arms, and second connecting means interconnecting the actuator means with the variable nozzle flaps.

3. The retractable sound suppressor of claim 2 wherein: the actuating means is a linear actuator having an actuator rod extending therefrom, the first connecting means includes a unison cone disposed for translation with the actuator rod and rotatably connecting to a plurality of circumferentially spaced links at the outer periphery thereof wherein the opposing ends of the links connect to respective lever arms from the divider chutes, and the second connecting means includes a unison ring disposed for translation with the actuator rod and rotatably connecting to a second plurality of circumferentially spaced links which extend through the exhaust duct into rotatable connection with respective lever arms from the variable nozzle flaps.

4. The retractable sound suppressor of claim 2 including a plurality of seal strips interleaved between the variable flaps wherein the trailing edges of the nozzle flaps and seal strips are indented, said indentations conforming generally to the cross-sectional shape of the outer radial tips of the divider chutes and aligning with the outer radial tips of the divider chutes when the chutes are rotated into the operative position thus permitting ram air to enter the divider chutes through the indentations and flow radially inward and then outward of the chutes so as to reduce the drag of the chutes and increase performance efficiency.

5. The retractable sound suppressor of claim 2 wherein the exhaust duct is defined generally between inner and outer annular wall members and the nozzle flaps are disposed for rotation about the aft end of the outer wall member with the divider chutes pivotally connected to the aft end of the inner wall member and further including an exterior cowling spaced apart from the outer wall member so as to define an annular plenum therebetween for the receipt of an inlet cooling airflow to cool the exterior cowling.

6. The retractable sound suppressor of claim 5 including a plurality of circumferentially spaced apart hollow struts extending radially between the inner and outer wall members and a tailcone in downstream serial flow arrangement with the inner annular wall member wherein the leading edge of the tailcone is spaced radially inward of the inner wall member so as to define an annular ejection slot such that the cooling airflow from the plenum is directed radially inward through the hollow struts so as to cool the actuating means after which the cooling airflow is ejected through the annular ejection slot as a result of the locally depressed static pressure caused by the aspirating effect of the high velocity exhaust system exiting from the nozzle.

* * * * *